Figure 1:
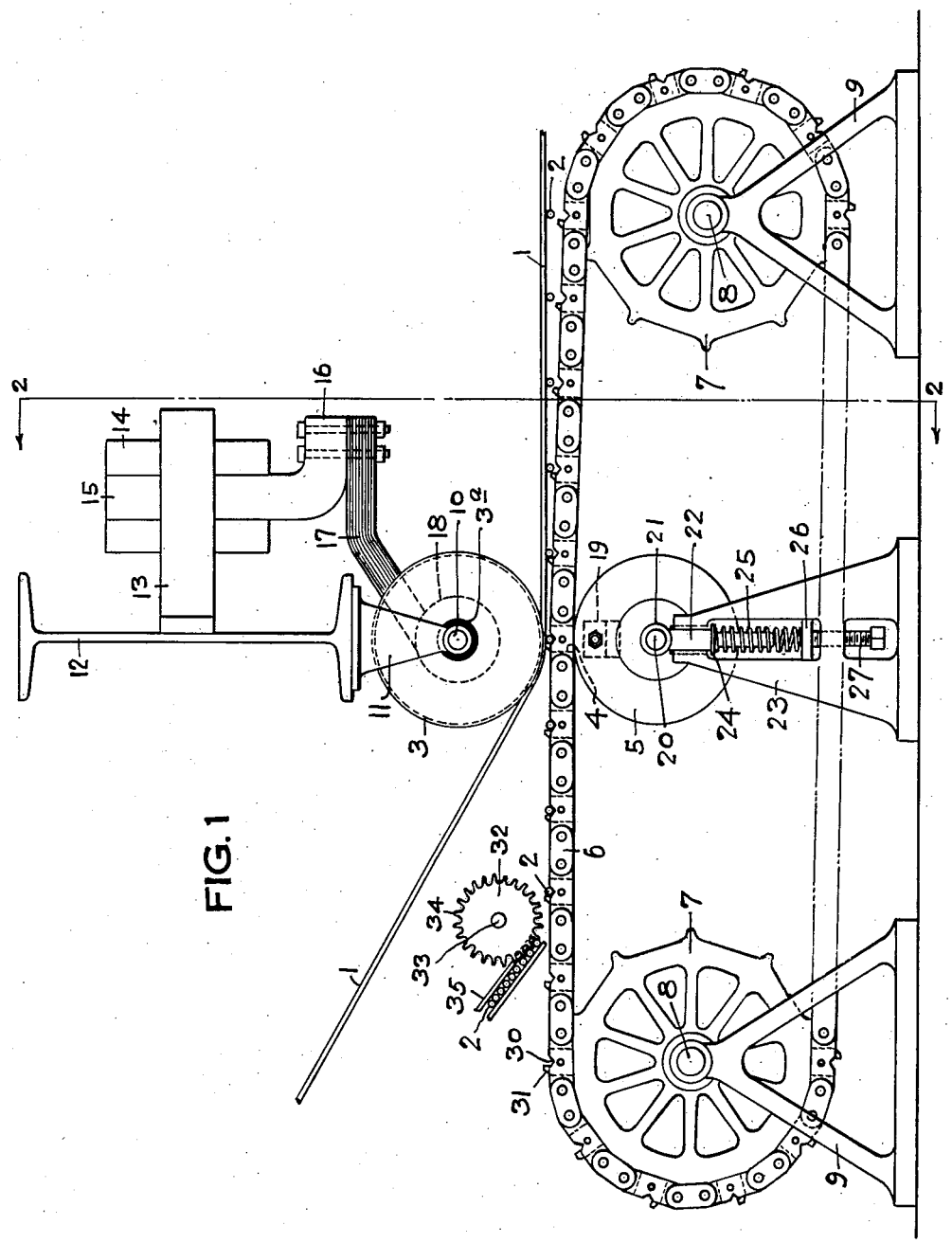

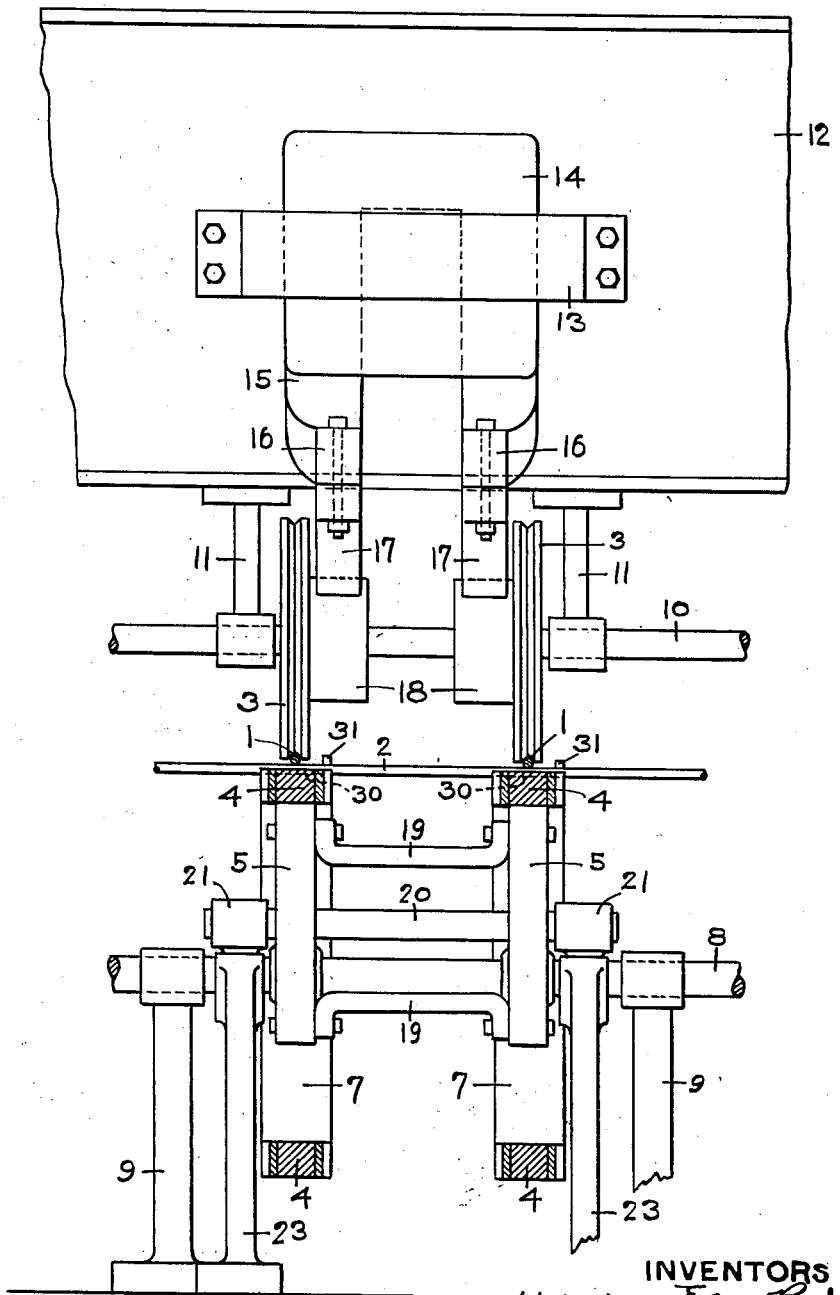

Patented Sept. 2, 1924.

1,507,425

UNITED STATES PATENT OFFICE.

WILLIAM EDGAR REED, OF PITTSBURGH, AND EDWARD L. BENEDICT, OF SEWICKLEY, PENNSYLVANIA, ASSIGNORS TO PITTSBURGH STEEL COMPANY, OF PITTSBURGH, PENNSYLVANIA, A CORPORATION OF PENNSYLVANIA.

ELECTRIC WELDING MACHINE.

Application filed May 29, 1922. Serial No. 564,372.

*To all whom it may concern:*

Be it known that we, WILLIAM EDGAR REED and EDWARD L. BENEDICT, citizens of the United States, and residents of Pittsburgh and Sewickley, respectively, in the county of Allegheny and State of Pennsylvania, have invented a new and useful Improvement in Electric Welding Machines; and we do hereby declare the following to be a full, clear, and exact description thereof.

Our invention relates to electric welding machines, and has special reference to machines for welding crossed wires or rods, as in the manufacture of welded metal fabrics for fencing and concrete reinforcement, and for other similar purposes.

One object of our invention is to provide a welding machine of simple and rugged construction, wherein the current and pressure necessary for welding are supplied by means of rotary electrodes.

Another object of our invention is to provide a machine of the character indicated having improved means for automatically bringing the cross wires or stay wires into contact with the longitudinal strand wires.

A further object of our invention is to provide an electric welding machine suitable for the rapid production of heavy metal fabrics, where the materials pass continuously between pressure electrodes of either sliding or rotary types or a combination of these types.

Our machine consists, in general, of two or more endless chains mounted on sprocket wheels with the upper runs of the chains horizontal, and having certain of their links composed of welding anvils or tables, each of which has a notch or other means for positioning a stay wire, and for causing the stay wire to advance with the chain. Each chain passes between upper and lower welding rollers, between sliding electrodes, or between one rotary electrode and one sliding electrode, the electrodes on one side of the chain being grooved to receive and guide the strand wires. The stay wires are deposited on the welding links of the endless chains by suitable automatic means, and are advanced into contact with the strand wires, whereupon the strand wires and stay wires are welded together by means of the cooperating electrodes. The fabric is advanced continuously past the welding electrodes, either by means of the chains or by additional feeding means, and the electrodes are provided with suitable means for completing the electric circuit through them as each stay wire arrives at the welding position.

In the accompanying drawing, Fig. 1 is a side elevational view showing the essential parts of a machine constructed in accordance with our invention; and Fig. 2 is a somewhat enlarged end view of the same machine, partly in elevation and partly in section on the line 2—2, Fig. 1.

Referring to the drawing, the numerals 1 indicate a set of strand wires, two of which are shown in the drawing, although the number and spacing of these wires will vary in accordance with the nature of the fabric to be made. Cross members shown as stay wires 2, are applied from beneath to the strand wires 1, and the joints between the strand wires and stay wires are compressed between rotary electrodes 3 and anvils or tables 4 which constitute alternate links of endless chains and which at the welding point, are supported upon electrode rollers 5. The endless chains composed of the anvils or tables 4 and open links 6 extend around sprocket wheels 7 which are mounted on horizontal shafts 8 carried by standards 9. We have also found that the lower rollers 5 may be replaced by stationary electrodes which may slidably support the chains, for example, through roller bearings.

The upper electrode rollers 3 are mounted on a shaft 10, and are insulated therefrom, suitably by means of insulating bushings 3[a], which are suspended from hangers 11 that are bolted or otherwise secured to the under side of an I-beam 12. The I-beam 12 also carries a support 13 in which is mounted a transformer composed of a primary winding 14 and a secondary winding 15. To the terminals 16 of the secondary winding 15 are bolted or otherwise secured brushes 17 which rest upon slip-rings 18 which are integral with, or electrically connected to, the welding rollers 3.

The lower electrode rollers 5 are electrically connected together, as by means of a bridge bar 19 shown in Fig. 2. The circuit through the secondary winding of the transformer is therefore completed whenever a stay wire arrives at the welding position, the current passing from one of the terminals 16 through the adjacent slip-ring 18 and roller 3, to and through the joined wires, and thence through the anvil or table 4 which supports the stay wire, then to the adjacent roller 5, across to the other roller 5, through the bar 19, and then back through a similar series of parts to the other terminal 16 of the secondary winding. By similar bridging means, the transformer may be connected to simultaneously weld two joints on the same strand wire instead of two joints on adjacent strand wires, in which case a separate transformer is provided for each strand wire.

The lower electrode rollers 5 are mounted on a horizontal shaft 20 which is supported in bearings 21 at the upper ends of two or more vertical bars 22 which extend loosely through openings in the upper ends of standards 23. Each of the bars 22 is provided with a collar 24 which rests upon a strong coiled spring 25, the lower end of which rests upon a plate 26 carried at the upper end of an adjusting screw 27 by means of which the tension of the spring 25 may be regulated. The pressure with which the rollers 5 yieldingly support the endless chain may thus be varied in accordance with the size and nature of the material to be welded. The transformer may evidently be placed below the chains if desired, and may be connected to the lower electrode rollers 5, in which case the rollers 5 must be insulated from the shafts 20.

Each of the solid links 4 of the endless chains is provided with a notch 30 for receiving the stay wires 2, and with a finger 31, adjacent to the notch 30, which engages the stay wires 2 and insures that these wires are advanced with the chains.

We provide suitable means for automatically feeding the stay wires 2 upon the endless chains. Such a device is shown somewhat diagrammatically on Fig. 1, and as there shown consists of a set of toothed wheels 32 mounted on a shaft 33 and having their teeth 34 adjacent to the discharge end of a runway 35 in such a manner that, as the wheels 32 rotate in a counter-clockwise direction, the teeth 34 engage the stay wires 2 and feed them down upon the upper runs of the endless chains at the proper times to be received and carried forward in the notches 30, assisted by the fingers 31. It will be understood that this particular form of device for feeding the stay wires is not an essential part of our invention, since the stay wires may be delivered in a variety of ways, and may travel either in the downwardly inclined direction shown in the drawing, or in a horizontal direction in line with the upper runs of the endless chains. It will also be understood that our machine is not necessarily restricted to the automatic feeding of previously cut stay wires, but may be provided with well known means for feeding the stay wires one by one from a continuous length of wire, and for cutting off each stay wire as it is fed upon the endless chains. However, we prefer at present to feed previously cut stay wires, since this method permits the machine to be simpler in construction.

In operation, the strand wires 1 are drawn from any suitable source and are led beneath the grooved rollers 3. The stay wires 2 are fed upon the endless chains, which are advanced at the same speed as the strand wires 1 suitably by engagement of the fingers 31 with some of the stay wires of the completed fabric. As each stay wire 2 reaches the welding position, it is applied to the under side of the strand wires 1, and the joints between the wires are pressed together by the rolling pressure of the upper rollers 3, the table or anvil 4 being yieldingly supported by the lower electrode roller 5. At this time the electric circuit is completed in the manner described above, and the joint is electrically welded without interrupting the forward travel of the strand wires and the stay wires. After leaving the welding position, the fabric is preferably led in a direction which rises somewhat from the horizontal, as shown in Fig. 1, in order to detach the stay wires from their seats upon the endless chains and to clear the fingers 31.

While we have shown and described the construction of a machine suitable for carrying out our invention, it will be understood that various changes may be made within the scope of the appended claims, and that the machine is not restricted to the welding of wires, but may also be used in welding heavier strand and stay members, as in the manufacture of reinforcing fabric for roads and buildings.

We claim as our invention:

1. Electric welding apparatus for applying stay members to a series of strand members, comprising welding means disposed on one side of said series, rectilinearly movable welding means at the other side of said series and movable in the same direction and at the same speed as said strand members, and means for continuously moving the last-named welding means.

2. Electric welding apparatus for applying stay members to a series of strand members, comprising freely rotatable welding means disposed on one side of said series, and rectilinearly movable welding means at the other side of said series and movable in the same direction and at the same speed as said strand members.

3. Electric welding apparatus for applying stay members to a series of advancing strand members, comprising rotary welding contact means disposed on one side of said series, rectilinearly movable welding means at the other side of said series and movable in the same direction and at the same speed as said strand members, and rotary electric contact means engaging said last-named welding means on the side opposite to said first-named welding means.

4. Electric welding apparatus for applying stay members to a series of advancing strand members, comprising rotary welding contact members disposed on one side of said series, rectilinearly movable welding means at the other side of said series and movable in the same direction and at the same speed as said strand members, rotary electric contact means engaging said last-named welding means on the side opposite to said first-named welding means, and means for yieldingly forcing one of said rotary contact means toward the other.

5. Electric welding apparatus comprising means for continuously advancing a series of strand members in a generally horizontal direction, means moving with the strand members for applying a series of stay members from beneath to the said strand members, and means for electrically welding said strand members and stay members at their points of intersection.

6. Electric welding apparatus comprising means for guiding the advance of a series of strand members in a generally horizontal direction, means for applying a series of stay members from beneath to the said strand members and for supporting said stay members against vertical and horizontal displacement, and means comprising rotary welding contact members for welding said strand members and said stay members at their points of intersection.

7. Electric welding apparatus comprising means for guiding the advance of a series of strand members in a generally horizontal direction, means for applying a series of stay members from beneath to the said strand members, rotary welding contact members disposed above the said series of strand members and serving as a portion of the said guiding means, and welding contact means disposed below said strand members.

8. Electric welding apparatus comprising means for guiding the advance of a series of strand members in a generally horizontal direction, and means for applying a series of stay members from beneath to the said strand members comprising endless chains having links provided with means for receiving the stay wires, the said links also serving as welding contact members.

9. Electric welding apparatus comprising spaced endless chains, means carried by said chains for positioning and advancing stay members, and rotary electric contact means disposed adjacent to said chains and on opposite sides thereof.

10. Electric welding apparatus comprising spaced endless chains consisting of open links alternated with solid links forming welding tables, the said solid links being provided with notches for receiving stay members, yieldingly mounted electric contact rollers supporting the upper runs of said chains, and rotary welding electrodes disposed above the upper runs of said chains.

11. Electric welding apparatus comprising spaced endless chains consisting of open links alternated with solid links forming welding tables, the said solid links being provided with notches for receiving stay members, yieldingly mounted electric contact rollers supporting the upper runs of said chains, and rotary welding electrodes disposed above the upper runs of said chains, the said upper rollers being grooved to receive a series of strand members.

12. Electric welding apparatus comprising spaced endless chains consisting of open links alternated with solid links forming welding tables, the said solid links being provided with notches for receiving stay members, yieldingly mounted electric contact rollers supporting the upper runs of said chains, rotary welding electrodes disposed above the upper runs of said chains, and means for automatically feeding stay members upon said chains.

13. Electric welding apparatus comprising spaced endless chains consisting of open links alternated with solid links forming welding tables, the said solid links being provided with notches for receiving stay members, yieldingly mounted electric contact rollers supporting the upper runs of said chains, rotary welding electrodes disposed above the upper runs of said chains, and means for automatically feeding stay members upon said chains comprising a magazine and a toothed member disposed adjacent to said magazine and adapted to receive stay members successively from said magazine and deposit said members upon said chains.

14. Electric welding apparatus comprising a plurality of sets of sprocket wheels, parallel endless chains extending around said sprocket wheels and composed of alternate open links and solid links, said solid links being provided with notches for receiving wires or the like, and with fingers for engaging and advancing said wires, rotary electric contact members yieldingly supporting the upper runs of said chains from beneath, welding contact rollers disposed above said chains and provided with grooves for receiving strand members, and means for supplying welding current to the said rotary electrodes.

15. Electric welding apparatus for applying stay members to strand members, comprising rotatably mounted welding electrodes for engaging one side of the strand members, rectilinearly movable welding electrodes disposed adjacent to the opposite side of said strand members, and means on said last-named electrodes for supporting a series of stay members in position to be welded to said strand members by said first and last-named electrodes, the movement of said strand and stay members being controlled by movement of the second-named electrodes.

16. Electric welding apparatus comprising an electrode past which strand wires are moved, rectilinearly movable electrodes disposed at the opposite side of the strand wires and movable past the first-named electrode and means on said second-named electrodes for supporting and carrying stay wires in position to be welded to the strand wires when passing said first-named electrode.

In testimony whereof we the said WILLIAM EDGAR REED and EDWARD L. BENEDICT have hereunto set our hands.

WILLIAM EDGAR REED.
EDWARD L. BENEDICT.